United States Patent [19]
Biletch et al.

[11] 4,183,878
[45] Jan. 15, 1980

[54] HIGH IMPACT POLYSTYRENE RESIN

[75] Inventors: Harry A. Biletch, Lexington; Rodney Route, Leominster, both of Mass.; Jack Zomlefer, Plantation, Fla.

[73] Assignee: Solar Chemical Corporation, Leominster, Mass.

[21] Appl. No.: 928,102

[22] Filed: Jul. 26, 1978

Related U.S. Application Data

[63] Continuation of Ser. No. 655,546, Feb. 5, 1976, abandoned, which is a continuation-in-part of Ser. No. 408,172, Oct. 19, 1973, abandoned.

[51] Int. Cl.$^2$ ............................................ C08F 279/02

[52] U.S. Cl. ........................................ 525/86; 525/70; 260/4 AR

[58] Field of Search ........................ 260/876 R, 880 R

[56] References Cited
U.S. PATENT DOCUMENTS 3,925,511  12/1975  Loveless ........................ 260/880 R

*Primary Examiner*—Paul R. Michl
*Attorney, Agent, or Firm*—Stevens, Davis, Miller & Mosher

[57] ABSTRACT

Polystyrene resins of high impact are provided by graft copolymerization of styrene with elastomeric polymers of a diene monomer in the presence of a peroxy-free azo catalyst such as 1-cyano-(tert-butylazo) cyclohexane.

10 Claims, No Drawings

HIGH IMPACT POLYSTYRENE RESIN

This application is a continuation of application Ser. No. 655,546 filed on Feb. 5, 1976 and now abandoned, which was a continuation-in-part of application Ser. No. 408,172 filed on Oct. 19, 1973, now abandoned.

BACKGROUND OF INVENTION

This invention relates to an elastomeric polymer of a diene monomer to which polystyrene chains are attached. It also relates to such a polymer dispersed in polystyrene to provide a composition having a substantially greater impact strength than previously described polystyrene resins and also improved aging characteristics.

Regular polystyrene resin, made solely from styrene monomer, is hard but brittle, has a tensile strength of approximately 6500 pounds per square inch, a percent elongation of approximately 2% and an Izod impact strength of approximately 0.3 foot-pounds per square inch. In order to improve the impact strength, elongation and flexibility of polystyrene resins, a number of methods have been employed in the past.

One such method is to blend the polystyrene resin with elastomeric polymers of conjugated dienes such as natural or synthetic rubbers.

British Pat. No. 16,278 (6-6-1912), F. E. Matthews.
Rubber Chem. & Tech. Revs., 38, 1164 (1965), Angier, D. G. and Fettes, E. M.
Off. Dig. Fed. Paint Varnish Prod. Clubs., 28, 858 (1958), Clover, G. C. and Merz, E. H.
Trans. Inst. Rubber Ind., 33, 22 (1957), Angier, D. J. and Watson, W. F.

Another method has been to chemically react a small proportion of such elastomeric polymers with a large proportion of styrene monomer. These products have been referred to as "graft copolymers" and have resulted in resins of improved impact strength.

U.S. Pat. No. 1,613,673 (1927)—Ostromislensky
U.S. Pat. No. 2,694,692 (Nov. 16, 1954)—Amos, McCurdy and McIntire
U.S. Pat. No. 2,496,653 (1950)—Allen The resultant graft copolymers and the methods for their preparation vary quite widely as exemplified by the following references:

J. Polymer Sci., 20, 317 (1956), Blanchette, J. A. and Nielson, L. E.
J. Polymer Sci., 24, 292 (1957), Bevilacqua, E. M.
J. Appl. Polymer Sci., 5, 149 (1961), Smets, G., Roovers, J. and Humbeck, W.
J. Appl. Polymer Sci., 9, 2887 (1965), Bender, B. W.
J. Appl. Polymer Sci., 2, 2361 (1967), Keskkula, H. and Traylor. P. A.
Appl. Polymer Symp. (A.C.S.), Sept. 10, 1967, P. 21 Vander Hoff, B. M. E.
Brit. Pat. No. 1,044,565 (5-10-66)—Cosden Oil and Chem. Co.
Brit. Pat. No. 1,011,337 (11-24-65)—Dow Chemical Co., Ruffing, N. R., Kozakiewics, B. A., Cave, B. B. and Amos, J. L.
Brit. Pat. No. 1,002,902 (2-9-65)—Foster Grant, Inc., Westphal, R. C. and Heinig, P. R.
Brit. Pat. No. 1,077,768 (2-8-67)—Shell International, Inc.
U.S. Pat. No. 3,144,420 (8-11-64)—Koppers Co., Inc., Fryling, C. F.
Brit. Pat. No. 1,011,499 (1-12-65)—Rexall Drug Chem. Co.
U.S. Pat. No. 3,644,587 (1-22-72)—Finberg, A.
U.S. Pat. No. 3,696,172 (10-3-72)—Kaiko et al
Brit. Pat. No. 1,307,757 (2-21-73)—Foster Grant Co.

For example, in the British Pat. No. 1,044,565, a polystyrene of improved impact strength was prepared by dissolving about 2–10% of polybutadiene rubber (cis isomer content of approximately 35%, trans isomer content of about 55%) in styrene monomer together with a minute amount of anti-oxidant and mercaptan modifier. The solution was heated until there was about 40% polymerization. At this point, a peroxide type catalyst, namely tert-butyl perbenzoate, was added together with water and suspending agent to form an aqueous suspension. The heating was then continued to complete the polymerization and provide polymer beads. The impact strength as measured on an Izod machine was described as ranging from 3–6 foot-pounds per inch, depending on the percent of polybutadiene rubber. If a higher cis isomer content of polybutadiene was used, the product had a lower impact strength but better moldability.

A number of studies have been made of the chemistry of the graft copolymerization of rubber and styrene. However, there is insufficient information on the chemistry of the graft reaction, the desirable chemical species to attain, or the exact relationships of these factors to the physical properties of the graft copolymer. It is generally agreed that at about 2 to 25% styrene monomer conversion there is an "inversion point" wherein the rubber/styrene solution phase inverts to become the inner phase while the polystyrene/styrene solution component appears as the continuous phase. Precipitated rubber particles appear and are dispersed throughout the polystyrene. An optimum rubber particle size appears to be 2–15 microns but the size formation appears to depend on a number of factors such as elastomer type, concentration and temperature. Cross-linking is generally adverse to both impact strength and elongation.

J. Appl. Polymer Sci. 9, 2887 (1965), Bender, B. W.
Appl. Polymer Symp. (A.C.S.), Sept. 10, 1967, P. 21, Vander Hoff, B. M. E.
Rubber Chem. and Tech., 43, No. 5, 1129 (1970), Wagner, E. R. and Roberson, L. M.
J. Polymer Sci., 24, 297 (1957), Lundstedt, O. W. and Bevilacqua, E. M.
Chim. Ind. (Milan), 51, (4), 351–356 (1969), Manaresi, P. et al.
Die Angewandte Makromolekulare Chemie, 19 (1971), 113–120 (No. 114), RAO, K. V. C.
Br. Polym. J., 1971, Vol. 3, Jan., pgs. 9–12, Ebdon, J. R.

The principal catalysts that have been used in graft copolymerization have been peroxy catalysts such as benzoyl peroxide. Certain azo catalysts such as azobisisobutyronitrile have been suggested as catalysts for polymerization of styrene. However, as pointed out in U.S. Pat. No. 3,644,587 azo-bisisobutyronitrile produces no grafting of polystyrene on rubber and a peroxide catalyst is required.

Although polystyrene resins of improved impact strength have been provided by the methods described in the prior art, the resultant products are usually accompanied by one or more deficiencies, such as inadequate aging characteristics, difficulty in molding, insufficient tensile strength and inadequate flexibility and solubility.

One object of the present invention is to provide a novel elastomeric polymer of a diene monomer to which polystyrene chains are attached and which is characterized in that its dispersion in a matrix of polystyrene provides compositions of improved impact strength, tensile properties and solubility.

Another object of the present invention is to provide polystyrene resins of improved impact strength accompanied by good aging resistance, flexibility, moldability, tensile properties and substantially complete solubility.

A further object of this invention is to provide a commercially feasible method for producing such resins.

SUMMARY OF INVENTION

The present invention comprises as a new composition of matter a graft copolymer of a styrene monomer with about 1 to 15% of an essentially uncrosslinked elastomeric polymer of a diene monomer. The graft copolymer is characterized as having 2 to 4 polystyrene branch sites per rubber chain and being essentially uncrosslinked. It has improved impact strength over regular polystyrene resins, is readily moldable, has satisfactory tensile properties and flexibility and has excellent aging characteristics.

The styrene monomers which can be employed in preparing the graft compositions of the present invention are styrene and the $C_1$–$C_5$ alkyl and halogen substituted derivatives of styrene. Examples of these derivatives are those listed below used as such or in mixture with each other or styrene:

alpha methyl styrene
alpha ethyl styrene
alpha chloro styrene
o-methyl styrene
p-chloro styrene
p-bromo styrene
m-ethyl styrene
p-tertiary butly styrene Styrene is the preferred monomer and the invention will be described in detail with respect to styrene.

The chain length of the polystyrene attached to the elastomeric polymer is preferably in the range of about 250,000 to 700,000 molecular weight. The polymer can be used as such or may be dispersed in a matrix of polystyrene preferably in a proportion of 4 to 36% by weight of the matrix. Where a matrix is used, the molecular weight of the polystyrene chains in the matrix is preferably similar to that on the elastomeric polymer.

Elastomeric polymers which can be used in the present invention include those unsaturated natural and synthetic rubbers which are essentially uncrosslinked. The synthetic rubbers are preferably those prepared by homopolymerizing $C_4$–$C_{10}$ diolefins such as butadiene-1,3, chloroprene, isoprene, 2,3-dimethyl butadiene-1,3; pentadiene-1,3; pentadiene-1,4; cyclopentadiene, 2-methyl pentadiene-1,3, hexadiene-1,4, hexadiene-2,4, norbornadiene, ethylidene norbornene and dicyclopentadiene or by polymerizing the dienes with each other or copolymerizable monomers such as styrene, alphamethyl styrene, acrylonitrile, acrylic acid, lower alkyl esters of acrylic acid. ethylene, propylene and isobutylene. Examples of the rubbers are smoked sheet, polybutadiene-1,3, polychloroprene, polyisoprene, conventional styrene-butadiene rubber (SBR), block styrene-butadiene rubber (SBS), acrylonitrile-butadiene rubber (NBR), isobutylene-isoprene rubber (butyl rubber) and terpolymer rubbers of ethylene-propylene and a diene such as norbornadiene, hexadiene 1,4 and dicyclopentadiene (EPDM). The preferred rubber is a linear homopolybutadiene polymerized to have a cis-1,4 content of 25–99.5 in its molecular configuration.

The present invention also contemplates a novel method for making such graft copolymer. The method comprises the use of an unsymmetrical peroxy-free azo catalyst of the structure R—N=N—R' where R and R' are different radicals and the R radical is selected from $C_2$ or higher alkyls, substituted $C_1$ or higher alkyls, cycloalkyls, aryl-substituted alkyls, substituted cycloalkyls and substituted-aryl-substituted alkyls and being characterized by being capable of initiating styrene monomer polymerization and abstracting hydrogen from a natural or synthetic rubber, and the R' radical is selected from alkyl radicals in which the radical carbon carries a substituent selected from nitrile, nitro, aromatic, substituted aromatic, methoxy and halogen groups and being characterized by a resonance stabilization equivalent to the resonance stabilization in the styryl radical and being capable of initiating the polymerization of styrene but not capable of abstracting hydrogen from a natural or synthetic rubber. The R radical is preferably a tertiary alkyl e.g. tertiary butyl radical or substituted tertiary alkyl radical in which the substituent groups are selected from alkyl, cycloalkyl and aromatic radicals. The R and R' radicals can be further characterized in that on a reactivity scale of 0.1–14 where 14 is the reactivity of the very highly reactive benzoyloxy radical, the reactivity of the R radical would be in the range of 2–9 units and the reactivity of the R' radical would be in the range of 0.1–2 units. Thus, the isobutyronitrile radical would be at about 0.6, the 1-cyanocyclohexyl radical at about 1.0 and the tertiary butyl radical at about 4.0. Examples of R and R' combinations are as follows:

| R | R' |
|---|---|
| t-alkyl | t-alkyl (non-hydrogen abstracting) |
| t-alkyl | t-cyanocyloakyl |
| t-alkyl | alpha cyanophenylalkyl |
| t-alkyl | Bicyclo (2.2.2) alkyl |
| t-alkyl | p-Nitrophenylalkyl |
| t-alkyl | p-Methoxyphenylalkyl |
| t-alkyl | 1,1-Dicyanoalkyl |
| t-alkyl | Phenylalkyl |
| 1-cyanocycloalkyl | Phenylalkyl |
| 1-cyanocycloalkyl | alpha- t-butylalkyl |
| 1-cyanocycloalkyl | 2,6-Dialkyl cycloalkyl |
| 1-cyanocycloalkyl | Bicyclo (2.2.2) alkyl |
| 1-cyanocycloalkyl | p-Cyanophenylalkyl |
| isoalkyl | alpha-Phenylalkyl |
| phenylalkyl | Phenylalkyl |
| isoalkyl | Phenylalkyl |
| p-Cyanophenylalkyl | p-Cyanophenylalkyl |

The azo catalysts of this invention generally have 10-hour half lives at temperatures of from about 50° C. to 150° C., as measured on a 0.04 molar solution in trichlorobenzene. Examples of specific combinations are as follows:

| R | R' | 10-hour half-life Temperature °C. |
|---|---|---|
| t-butyl | cyanocyclohexyl | 96 |
| t-butyl | 2-cyanobutyl | 82 |

| R | R' | 10-hour half-life Temperature °C. |
|---|---|---|
| t-butyl | isobutyronitrile | 79 |

In one form of this method styrene is thermally bulk copolymerized at below 145° C. with 1 to 15% of the butadiene rubber in the presence of a mercaptan modifier past the point of inversion preferably to a monomer conversion of 15 to 55%. The polymerization is then completed in aqueous suspension at below 145° C. in the presence of one or more of the azo catalysts. Water and suspending agent are added after the introduction of the azo-type catalyst. Water soluble suspending agents are preferred as for example, polyvinyl alcohol or hydrolyzed polyvinyl acetate. Mineral oil is preferably added to act as an internal plasticizer. Mercaptan modifiers which are useful in this method include both aromatic and aliphatics. Examples include $C_{8-20}$ aliphatics such as dodecyl, stearyl, myristyl and tert-dodecyl mercaptan and mixtures thereof. The amount and type of azo catalyst used have an influence on the properties of the resulting resin. The amount will generally be about $0.065 \times 10^{-4}$ to $2.40 \times 10^{-3}$ mole per mole of monomer. Thus, the number average molecular weight is proportional to the inverse square root of the catalyst concentration. It is generally preferable to attain 99.5% or higher conversion with a catalyst residue of no more than 0.02%.

The resins produced in accordance with this invention are characterized as having essentially no gel, i.e. being substantially completely soluble in toluene, being at least 95% rubber grafted and having a very high resistance to discoloration on aging in light.

In contrast to all peroxy catalysts which produce two free radicals which in addition to causing the polymerization of styrene are extremely active in hydrogen abstraction from the rubber and thus leading to gel formation in addition to grafting, the azo catalysts furnish only one radical which will both participate in hydrogen abstraction reactions with the elastomer and cause styrene to polymerize. The second free radical only causes styrene to polymerize. Thus, gel formation is avoided. When, for example, tert-butylazo-1-cyanocyclohexane is utilized as the catalyst, tert-butyl and cyanocyclohexane radicals are produced. The former is extremely reactive and will cause hydrogen abstractions on rubber in addition to reacting with styrene monomer. The cyanocyclohexyl radical has about the same resonance stabilization as a styryl radical. Therefore, its tendency is to react with the styrene monomer only, to the exclusion of rubber. In a qualitative sense this limits the grafting reaction to one radical species and allows for graft site control without impeding the rate of polymerization.

Representative examples of this invention are described in the following specific examples. The polybutadienes used in these examples are characterized as being essentially uncrosslinked.

SPECIFIC EXAMPLES OF INVENTION

EXAMPLE 1

Styrene monomer (90.0 pounds) and polybutadiene (5.8 pounds) (cis=35%, trans=58%, vinyl=7%) were stirred in a 30 gallon Pfaudler reactor (100 R.P.M) at room temperature until all of the rubber had dissolved (12-15 hours). Tert-dodecyl mercaptan (48.7 gms.) was next added, and the temperature elevated rapidly to 113°-115° C. as the agitation rate was increased to 150 R.P.M.

Periodic sampling revealed a fairly rapid increase in viscosity as the copolymerization proceeded. After 2½ hours, the viscosity maximum was reached (16% conversion, 2850 cps./50° C.). Within a few minutes, phase inversion occurred, and the viscosity dropped to 525 cps/50° C. The reaction was continued at 114°-115° C. until a viscosity of 4500-4800 cps./50° C. had been achieved (7 hours). At this time, a solution of 122.5 grams (0.12 mole percent based on styrene) 1-cyano-(tert-butylazo) cyclohexane and 4.5 pounds of mineral oil (S.S.U. 85) in 2.0 pounds of styrene monomer was added. After a few minutes, 100.0 pounds of de-ionized water containing 1200 milliliters of a 5% aqueous solution of 52% hydrolyzed polyvinyl acetate was added, without agitation.

The temperature had diminished to 78°-81° C. after the addition of the water and suspending agent. The kettle contents were, therefore, rapidly heated to the polymerization temperature (95° C.) as the agitation rate was held constant (150 R.P.M.).

After 4.0 hours, semi-hard beads had been formed. The temperature was now elevated to 110° C. and held at this point for 4.0 hours. Quick cooling was then instituted as the slurry was stirred at 150 R.P.M.

The beads were separated by filtration through a 100 mesh screen. Batch washing consisted of 3×50 gallon successive rinses. Essentially no hydrolyzed polyvinyl acetate remained on the beads after this treatment.

The product was then dried at 70° C. for 18 hours.

Chemical, physical and mechanical properties are given in Table I of molded test samples formed from the dried beads after extrusion, pelletization and subsequent molding and testing. Results on the identification of the polystyrene - rubber graft copolymer is summarized under "chemical properties."

Example 1 was repeated except that 43.4 gms. of t-butyl perbenzoate was substituted for the 1-cyano-(tert-butyl azo) cyclohexane. The time and temperature conditions were essentially the same. Test samples were made as described with reference to Example 1 and the chemical, physical and mechanical properties are identified in the column entitled "1a" in Table I. This example is intended to serve as a control since the catalyst used is of the peroxy type, which is conventional.

EXAMPLE 2

The elastomer is the same type as in Example I as are the concentrations of the various formula adjuncts with the exception that two azo catalysts were utilized. Specifically, 56.8 grams (0.07 mole %) of 1-cyano-(tert-butylazo) cyclohexane and 46.2 grams (0.08 mole %) of (tert-butylazo) isbutyronitrile were utilized, as in the previous example, after the bulk copolymerization step.

The thermal polymerization was conducted at 113° C. for six hours to 33.8 percent conversion and a 5100 cps./50° C. viscosity with an agitation rate of 100 R.P.M.

Catalytic suspension polymerization was run at 90° C./5.0 hours/150 R.P.M. followed by 110° C./4.0 hours/150 R.P.M.

Washing, drying, extrusion and molding were the same as in Example 1. Table I summarizes the various properties.

EXAMPLE 3

Utilizing 8.0 pounds of the same elastomer as in Example I and a similar thermal polymerization procedure (113° C./6 hours/150 R.P.M) with 49.0 grams of tert-dodecyl mercaptan, a pre-polymer was prepared at 22.6% monomer conversion with a viscosity of 11,200 cps./50° C. To this heavy syrup was added 3.0 pounds of mineral oil (S.S.U. 85), 140.0 grams of 1-cyano-(tert-butylazo) cyclohexane and 100 pounds of de-ionized water containing 1200 milliliters of a 5%, partially hydrolyzed polyvinyl acetate solution, in that order, without agitation.

The suspension step was the same as in Example 1. The first phase was conducted at 95° C./5 hours/150 R.P.M., the second at 110° C./3 hours/150 R.P.M. and the final step at 125° C./1 hour/150 R.P.M.

Product isolation, washing, drying extrusion and molding steps are described in Example 1. Properties are tabulated in Table I and are to be compared with control, (Example 1a).

EXAMPLE 4

The elastomer type is the same as in Example 1 except that 10.2 pounds were added and the thermal polymerization conducted at 113° C./4.5 hours/150 R.P.M. to a viscosity of 6700 cps./50° C. representing a monomer conversion of 15.1% in the presence of 49.0 grams of tert-dodecyl mercaptan and 2.0 pounds of mineral oil.

The suspension polymerization steps were the same as in Example 3 as were the product work up and fabrication procedures. Evaluation results are shown in Table I. Graft copolymer identification is described in Table I under "Chemical Properties."

The product was fractionated according to the following procedure, with the results shown in Table II.

The first step in fractionation consisted of dissolving 50.00 grams of the product of Example 4 resin in 1500 mls. of toluene giving a 3.33% solution. This slightly hazy solution was pressure-filtered through an asbestos one micron pad so that the gelled or cross-linked rubber could be separated and analyzed. The filter was dried to constant weight so that the weight percent of gel could be determined. The table below, illustrates the volumes of heptane required to precipitate each fraction, the polymer fraction weights and the amounts of polystyrene which coprecipitated in each graft fraction.

TABLE I

PROPERTIES OF EXAMPLES 1, 2, 3 and 4

| | Example Nos. | | | | |
|---|---|---|---|---|---|
| | 1 | 1a | 2 | 3 | 4 |
| ANALYTICAL | | | | | |
| Melt Index, G, gms. /10 min. | 18.9 | 5.6 | 15.1 | 6.8 | 6.1 |
| Solution Visc., 10% toluene, cps. | 30.0 | 31.0 | 25.5 | 36.5 | 44.2 |
| % Total Volatiles, 140° C./3 hrs. | 1.76 | 0.60 | 1.43 | 0.83 | 0.93 |
| % Methanol Extractibles | 6.68 | 1.58 | 5.98 | 8.80 | 4.81 |
| % Styrene Monomer | 0.59 | 0.21 | 0.62 | 0.70 | 0.65 |
| PHYSICAL* | | | | | |
| Tensile Strength, yield, p.s.i. (ASTM D-638-68) | 3730 | 4880 | 3580 | 2705 | 2930 |
| Tensile Strength, fail, p.s.i. (ASTM D-638-68) | 2640 | 4530 | 2560 | 2545 | 2830 |
| % Elongation (ASTM D-638-68) | 34.8 | 25.6 | 45.6 | 50.6 | 60.4 |
| Izod Impact, ft. lbs. /s.i. (ASTM D-256-56) | 2.04 | 1.82 | 2.28 | 2.31 | 2.98 |
| Heat Deflection Temp., °F. (ASTM D-648-56) | 176 | 171 | 174 | 175 | |
| CHEMICAL | | | | | |
| % Rubber Grafted | 99.7 | — | — | — | 95.6 |
| Aver. Ratio-Styrene /Butene-2 in graft | 2.1 | — | — | — | 2.8 |
| M.W. Polystyrene matrix, $[n]_i$ | $3.3 \times 10^5$ | — | — | — | $3.7 \times 10^5$ |
| M.W. Graft Copolymer, calcd. | $1.09 \times 10^6$ | — | — | — | $1.46 \times 10^6$ |
| % Gel, toluene | <0.1 | — | — | — | <0.1 |
| Un-reacted Rubber, soluble | 0.2 | — | — | — | 4.3 |
| Color (Fadeometer, 400 hrs.), compared to un-aged sample | None | — | — | — | — |

*Injection molded, ¼" specimens, A.S.T.M. Methods.

TABLE II

FRACTIONATION RESULTS

Solution: 50.00 grams of the product of Example 4 in 1500 mls. toluene.

| No. | HEPTANE Vol., mls. | TOTAL Wt., gms. | PURE GRAFT(a) Wt., gms. | POLYSTYRENE Wt., gms. | GRAFT(b) % Rubber | STYRENE(c) BUTENE-2 |
|---|---|---|---|---|---|---|
| A(d) | 0.0 | 0.0045 | — | — | — | — |
| I | 1800. | 10.61 | 10.32 | 0.29 | 35.0 | 2.4 |
| II | 2045. | 6.43 | 6.09 | 0.34 | 28.5 | 2.8 |
| III | 2110. | 2.03 | 1.35 | 0.68 | 26.7 | 3.3 |
| IV | 2710. | 17.12 | — | 17.12 | 0.0 | — |
| V | 3350. | 6.05 | — | 6.05 | 0.0 | — |
| VI | 3600. | 2.74 | — | 2.74 | 0.0 | — |
| VII | 4000. | 1.26 | — | 1.26 | 0.0 | — |
| VIII | 4200. | 0.21 | — | — | — | 0.0 |

(a) Weight obtained after the initial fraction was fractionally reprecipitated three times more, in the following sequence:
From Chloroform with Methanol
From Toluene with Methanol
From Chloroform with Heptane
(b) From quantitive Infra-red spectrophotometric analysis
(c) Molecular Weights: Polybutadiene - $4 \times 10^5$
Polystyrene - $3.1\text{-}3.7 \cdot 10^5$ (intrinsic Visc.)
(d) Represents "gel" or insoluble, cross-linked rubber.

EXAMPLE 5

Styrene monomer (90.0 pounds) and polybutadiene (5.8 pounds) (cis=98%, vinyl—2%) were stirred at 100 R.P.M. in a 30 gallon Pfaudler reactor, at room temperature until all of the rubber had dissolved. Tert-dodecyl mercaptan (37.0 grams) was added and the temperature elevated rapidly to 113°–115° C. as the agitation rate was increased to 150 R.P.M. The reaction temperature was levelled out at 115° C. and held at this point for 6.5 hours. The monomer conversion was 27.1 % with the viscosity equal to 5200 cps./50° C.

Mineral oil (4.5 pounds) (S.S.U. 85) and 1-cyano-(tert-butylazo) cyclohexane (115 grams, 0.15 mole percent) were next added followed by a solution of 1200 mls. of 5% polyvinylalcohol in 100 pounds of de-ionized water. The reaction temperature was adjusted to 95° C. and the suspension was stirred for 6 hours at 150 R.P.M.

Maintaining the same agitation rate, the temperature was elevated to 125° C. and held at this point for an additional 3 hours.

Cooling was instituted and when the temperature had diminished to 50° C., the kettle contents were filtered, washed and dried. After extrusion and molding the properties were evaluated. These are summarized in Table III.

EXAMPLE 6

The same elastomer as in Example 5 was utilized except that 8.0 pounds were added and 49.0 grams of t-dodecyl mercaptan was utilized.

Pre-polymerization was conducted at 115° C./7.0 hours/150 R.P.M. attaining a viscosity of 9800 cps./50° C. with a 40.2% monomer conversion.

The formula adjuncts were the same as in the previous example except that 3.0 pounds of mineral oil (S.S.U. 85) was utilized.

Suspension procedures, cycles and product isolation steps were the same. The "Analytical" and "Physical" properties are listed in Table III.

EXAMPLE 7

The same elastomer as in Example 5 was utilized except that 10.2 pounds were added and 49.0 grams of t-dodecyl mercaptan was utilized.

Pre-polymerization was conducted at 115° C./5.5 hours/150 R.P.M. yielding a viscosity of 7700 cps./50° C. with a 42.6% monomer conversion.

Formula adjuncts, suspension procedures, cycles and product isolation were the same as in Example 4. Table III lists the properties after evaluation.

EXAMPLE 8

The same elastomer as in Example 5 was utilized except that 5.8 pounds were added.

The rubber was dissolved in 90.0 pounds of styrene in 22 hours at room temperature using 100 R.P.M. agitation rate.

Tert-dodecyl mercaptan (49.0 grams), mineral oil (4.5 pounds, S.S.U. 85) and 1-cyano-(tert-butylazo) cyclohexane (138.0 grams) were next added and the temperature levelled off at 95° C. with a 150 R.P.M. agitation rate. The reaction was allowed to proceed for 5.0 hours at which time the syrup exhibited a 4,600 cps. viscosity at 50° C. and a 36.5% monomer conversion.

One hundred pounds of de-ionized water containing 60.0 grams of partially hydrolyzed polyvinylacetate were added and the reaction was run for an additional 6 hours at 95° C. with good bead size formation. The temperature was then elevated to 125° C. and held for 3.0 hours at an agitation rate of 150 R.P.M.

Product isolation, drying, molding and extrusion were the same. Table III lists the properties after evaluation.

TABLE III

PROPERTIES OF EXAMPLES 5, 6, 7 AND 8

| | Example Nos. | | | |
|---|---|---|---|---|
| | 5 | 6 | 7 | 8 |
| ANALYTICAL | | | | |
| Melt Index, G. gms./10 min. | 11.3 | 6.3 | 3.8 | 10.8 |
| Solution Visc., 10% toluene, cps. | 26.0 | 39.0 | 40.6 | 26.0 |
| % Total Volatiles, 140° C./3 hrs. | 1.06 | 1.76 | 0.59 | 1.01 |
| % Methanol Extractibles | 4.17 | 4.16 | 4.44 | 4.73 |
| % Styrene Monomer | 0.85 | 0.60 | 0.47 | 0.66 |
| PHYSICAL* | | | | |
| Tensile Strength, yield, p.s.i. (ASTM D-638-68) | 3470 | 3200 | 2750 | 3600 |
| Tensile Strength, fail, p.s.i. (ASTM D-638-68) | 2530 | 2820 | 2510 | 2980 |
| % Elongation (ASTM D-638-68) | 42.1 | 45.9 | 52.9 | 33.8 |
| Izod Impact, ft. lbs./p.s.i. (ASTM 256-56) | 2.23 | 2.76 | 3.04 | 1.27 |
| Heat Deflection Tem., °F. (ASTM D-648-56) | 164 | 169 | 172 | — |

*Injection molded, ⅛" specimens, A.S.T.M. methods.

EXAMPLE 9

A dissolving tank was charged with a mixture of 90 parts by weight of styrene, 5.8 parts of comminuted polybutadiene rubber having 98% of its molecular units in the cis-1,4 configuration and 2% in the 1,2 i.e. vinyl configuration, 4.5 parts of mineral oil and 0.11 part of tertiary docecyl mercaptan. The mixture was stirred at room temperature until all the rubber had dissolved. The solution was filtered to remove any insoluble matter and then charged into a stirrer-equipped oxygen-free polymerization reactor where it was caused to polymerize by heating it at 105° C. under agitation for 9 hours. The usual phase inversion occurred during this period. The syrup was then transferred into a larger agitator-equipped polymerization reactor containing 105 parts of deionized water in which 0.13 part of polyvinyl alcohol suspending agent was dissolved. The mixture formed a suspension in water on being stirred. 0.15 part of a catalyst mixture of 52 parts of benzoyl peroxide and 17 parts of tertiary-butyl perbenzoate was added to the suspension which was then allowed to polymerize for 5 hours at 110° C. under continuous stirring. The reactor contents were next rapidly cooled and the high-impact resistant polystyrene beads were filtered off, washed with water and dried.

The gel content of the polystyrene was determined as follows:

(1) The polymeric bead product (10.00 gms.) was added to 500.0 mls. of toluene and shaken for 40 hours at room temperature.

(2) The cloudy suspension was filtered through a 1.0 micron asbestos pad (tared) under 20 p.s.i. nitrogen pressure, in a stainless steel filter. The effluent solution was crystal clear and gave no evidence of dispersed solids (turbidimetry).

(3) Four 500.0 ml. washes of the pad were next accomplished as the solvent was changed alternately—i.e. toluene, chloroform, toluene, chloroform.

(4) After the fourth solvent portion (chloroform) had been passed through, the pad was carefully removed from the filter and dried to constant weight in an air oven held at 50° C./2 mm./40 hours.

(5) The percent solids retained on the pad was determined by weighing and subtracting the tare.

(6) In this manner, 1.86 grams of gel were isolated or 18.6% based on the total resin utilized in the experiment. This is an example of the high gel content of high impact-resistant polystyrene resins prepared with peroxy catalysts according to prior known procedures and not in accordance with the present invention.

The foregoing procedure was used to prepare low-gel-content high impact resistant polystyrene resins according to the present invention by substituting various unsymmetrical azo catalysts for the peroxy catalyst. Three runs were made using 1-cyano-1-(t-butylazo) cyclohexane (A) with 5.8, 8.0 and 10.2 parts of the above-described 98% cis-1,4 polybutadiene. One run was made using this catalyst with 5.8 parts of a polybutadiene rubber having 35% of its units in the cis-1,4 configuration, 58% in the trans configuration and 7% in the vinyl configuration. One run was made with a 1/1 blend of this catalyst with 2-cyano-2-(t-butyl azo) isopropane (B) and 5.8 parts of the 35% cis-1,4 polybutadiene. One run was made with a 1/1 blend of 2-cyano-2-(t-butyl azo) isobutane (C) and 1-cyano-1-(t-amylazo) cyclohexane (D) catalyst and 7.5 parts of the above-described 98% cis-1,4 polybutadiene. The results obtained using the peroxy and azo catalysts are summarized in Table IV.

TABLE IV

| Catalyst | Rubber Type | Parts of Rubber | % Gel |
|---|---|---|---|
| Peroxy | 98% cis-1,4 | 5.8 | 18.6 |
| (A) | " | 5.8 | 0.13 |
| (A) | " | 8.0 | 0.41 |
| (A) | " | 10.2 | 0.14 |
| (A) | 35% cis-1,4 | 5.8 | 0.09 |
| (A)+(B) | " | 5.8 | 0.18 |
| (C)+(D) | 98% cis-1,4 | 7.5 | 0.12 |

The very low % gel content of the high-impact resistant polystyrenes prepared with the azo catalysts of the present invention illustrate their essentially uncrosslinked nature as compared to the highly crosslinked nature of those prepared with the peroxy catalysts of the prior art.

EXAMPLE 10

Ten commercially-used impact-resistant polystyrene resins, each from a different manufacturer, were analyzed for rubber content, rubber type and % gel content. Resins 1-7 are believed to have been prepared by a bulk-suspension polymerization using a peroxy catalyst, while resins 8-10 are believed to have been prepared in an all bulk polymerization using a peroxy catalyst. The results are summarized in Table V.

TABLE V

| Resin | Rubber Type | Rubber Content | % Gel |
|---|---|---|---|
| 1 | 35% cis-1,4 polybutadiene | 7.0 | 16.7 |
| 2 | " | 7.0 | 18.1 |
| 3 | " | 7.8 | 20.3 |
| 4 | " | 6.5 | 15.1 |
| 5 | " | 8.5 | 16.1 |
| 6 | " | 8.9 | 27.3 |
| 7 | 98% cis-1,4 polybutadiene | 9.5 | 22.2 |
| 8 | " | 9.0 | 20.0 |
| 9 | " | 10.6 | 26.7 |
| 10 | 35% cis-1,4 polybutadiene | 7.8 | 19.3 |

These results show that impact-resistant polystyrene resins prepared with peroxy catalysts are characterized by a high content of gel.

What is claimed is:

1. A method for the preparation of an impact resistant polystyrene resin which comprises copolymerizing a styrene monomer and 1 to 15% of an essentially uncrosslinked natural or synthetic rubber in a bulk-suspension system wherein the reaction in the bulk step is initiated thermally in the absence of any initiator compound but in the presence of a molecular weight modifier and continued to phase inversion, the system then being suspended in water and the reaction continued in the presence of an unsymmetrical peroxy-free azo catalyst of the structure R—N=N—R' where R and R' are different radicals and the R radical is selected from $C_2$ or higher alkyls, substituted $C_1$ or higher alkyls, cycloalkyls, aryl-substituted alkyls and substituted cycloalkyls and substituted aryl-substituted alkyls and being characterized by being capable of initiating styrene monomer polymerization and abstracting hydrogen from a natural or synthetic rubber, and the R' radical is selected from alkyl radicals in which the radical carbon carries a substituent selected from nitrile, nitro, aromatic, substituted aromatic, methoxy and halogen groups and being characterized by a resonance stabilization equivalent to the resonance stabilization in the styryl radical and being capable of initiating the polymerization of styrene but not capable of abstracting hydrogen from a natural or synthetic rubber, said R and R' radicals being further characterized by having reactivities of 2 to 9 and 0.1 to 2 respectively on a reactivity scale in which the benzoyloxy free radical has a reactivity rating of 14 and the isobutyronitrile free radical has a reactivity rating of 0.6.

2. The method of claim 1 wherein the polymer is a linear homopolybutadiene-1,4 having a cis content of 25-99.5 in its molecular configuration.

3. The method of claim 1 wherein R is 1-t-butyl and R' is 1-cyanocyclohexyl.

4. The method of claim 1 wherein R is 2-t-butyl and R' is 2-cyanobutyl.

5. The method of claim 1 wherein R is 2-t-butyl and R' is 1-isobutyronitrile.

6. The method of claim 1 wherein R is 1-tertiary amyl and R' is 1-cyanocyclohexyl.

7. The method of claim 1 wherein the R radical is selected from tertiary butyl and substituted tertiary butyl radicals in which the substituent groups are selected from alkyl, cycloalkyl and aromatic radicals.

8. The method of claim 1 wherein the R radical has a reactivity rating of 2-9 and the R' radical has a reactivity rating of 0.1-2 based on a scale where the benzoyloxy radical has a reactivity rating of 14 and the isobutyronitrile radical has a reactivity rating of 0.6.

9. A polystyrene composition comprising a matrix of polystyrene resin containing dispersed therein a natural or synthetic rubber of which at least 95% of the molecules are grafted with chains of polystyrene attached at an average of 2-4 sites per rubber molecule, the grafted chains of polystyrene being substantially the same length as the polystyrene molecules in the matrix with the grafted and matrix polystyrenes each having a weight average molecular weight of about 250,000-700,000, said polystyrene composition being essentially uncrosslinked and substantially completely soluble in toluene.

10. The polystyrene composition of claim 9 wherein the rubber is a linear homopolybutadiene having a cis-1,4 content of 25-99.5% in its molecular structure and is essentially uncrosslinked.

* * * * *

UNITED STATES PATENT AND TRADEMARK OFFICE
CERTIFICATE OF CORRECTION

PATENT NO. : 4,183,878
DATED : January 15, 1980
INVENTOR(S) : Harry A. BILETCH et al It is certified that error appears in the above-identified patent and that said Letters Patent are hereby corrected as shown below:

TABLE II, subnote (c)

"Polystyrene - 3.1 - $3.7 \times 105$ (intrinsic Visc.)"

should read,

-- Polystyrene - 3.1 - $3.7 \times 10^5$ (intrinsic Visc.) --.

Signed and Sealed this

Twenty-second Day of April 1980

[SEAL]

Attest:

SIDNEY A. DIAMOND

*Attesting Officer*  *Commissioner of Patents and Trademarks*